United States Patent
Nagatomo

(10) Patent No.: US 7,295,818 B2
(45) Date of Patent: Nov. 13, 2007

(54) ELECTRONIC DEVICE HAVING IMAGE CAPTURE AND RADIO COMMUNICATION FUNCTIONS, OPERATION CONTROL METHOD AND OPERATION CONTROL PROGRAM

(75) Inventor: Shoichi Nagatomo, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 462 days.

(21) Appl. No.: 10/899,695

(22) Filed: Jul. 26, 2004

(65) Prior Publication Data

US 2005/0026575 A1 Feb. 3, 2005

(30) Foreign Application Priority Data

Jul. 28, 2003 (JP) ............................. 2003-280646
Jul. 5, 2004 (JP) ............................. 2004-197626

(51) Int. Cl.
*H04B 1/04* (2006.01)
*H04B 7/00* (2006.01)

(52) U.S. Cl. ............................. 455/127.1; 455/414.1; 455/566

(58) Field of Classification Search ............. 455/556.1, 455/557, 300, 412.1, 414.1, 566; 348/224.1, 348/375, 333.1, 370, 362, 371; 396/542
See application file for complete search history.

(56) References Cited

U.S. PATENT DOCUMENTS

| | | | |
|---|---|---|---|
| 5,680,633 A | 10/1997 | Koenck et al. | |
| 6,014,705 A | 1/2000 | Koenck et al. | |
| 6,714,983 B1 | 3/2004 | Koenck et al. | |
| 6,823,198 B2 * | 11/2004 | Kobayashi | 455/556.1 |
| 7,136,672 B2 * | 11/2006 | Kitano et al. | 455/556.1 |
| 7,139,014 B1 * | 11/2006 | Kim et al. | 348/14.01 |
| 7,139,594 B2 * | 11/2006 | Nagatomo | 455/566 |
| 2004/0017824 A1 | 1/2004 | Koenck et al. | |
| 2004/0018851 A1 | 1/2004 | Koenck et al. | |
| 2004/0166895 A1 | 8/2004 | Koenck et al. | |

FOREIGN PATENT DOCUMENTS

| | | |
|---|---|---|
| EP | 1 089 578 A2 | 4/2001 |
| JP | 2000-092360 A | 3/2000 |
| JP | 2001-045349 A | 2/2001 |
| JP | 2002-320001 A | 10/2002 |
| JP | 2003-69868 A | 3/2003 |
| WO | WO93/25955 A1 | 12/1993 |

* cited by examiner

*Primary Examiner*—Tony T. Nguyen
(74) *Attorney, Agent, or Firm*—Frishauf, Holtz, Goodman & Chick, P.C.

(57) ABSTRACT

When an off-hook key is pressed in the power-off state, a power control unit applies power to circuits including a radio communication unit. When a camera mode startup power on/off key (manner key in the phone mode) provided on the side of the body is pressed in the power-off state, the power control unit applies power from a power supply to each circuit except the radio communication unit, whereby the signal-off mode is set and an imaging device, DSP and subdisplay unit are activated. After that, when a shutter key (memo key in the phone mode) is pressed, an image at that time is captured and stored into a RAM.

19 Claims, 8 Drawing Sheets

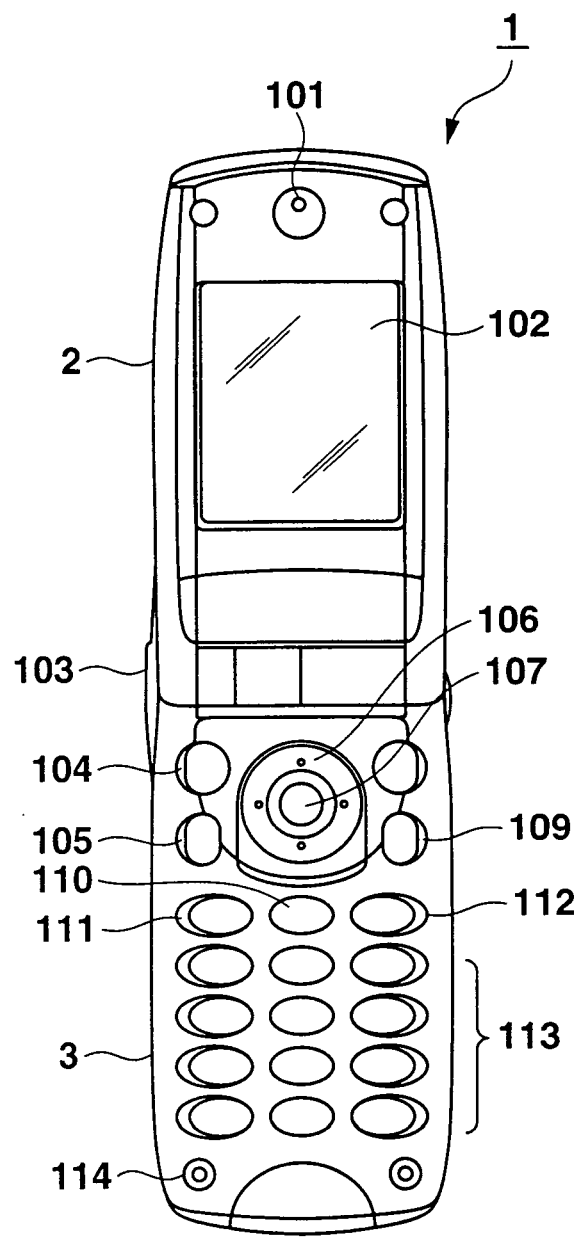
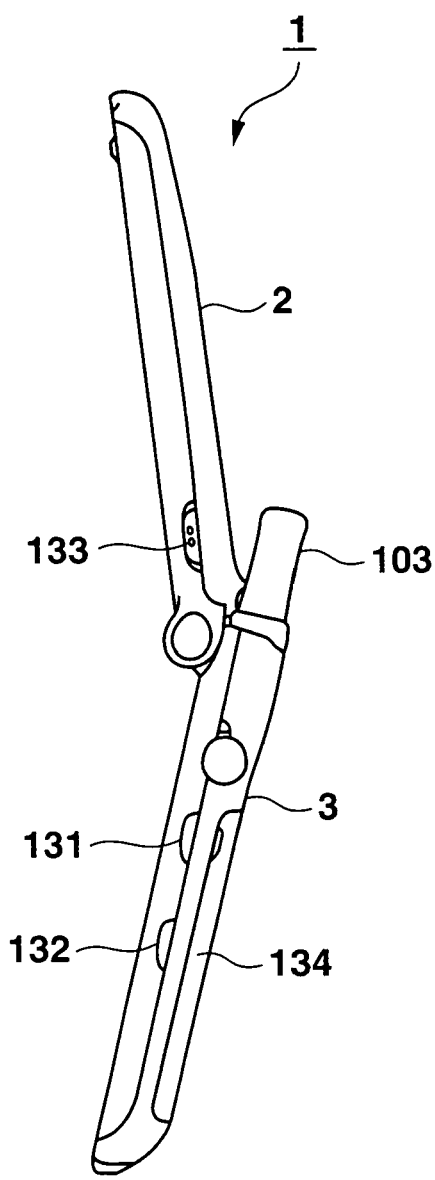
FIG.1A  FIG.1B

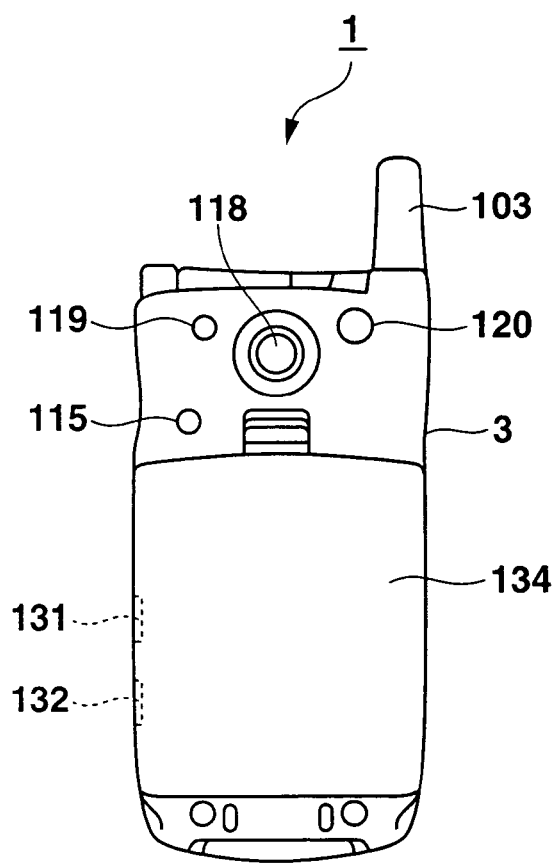
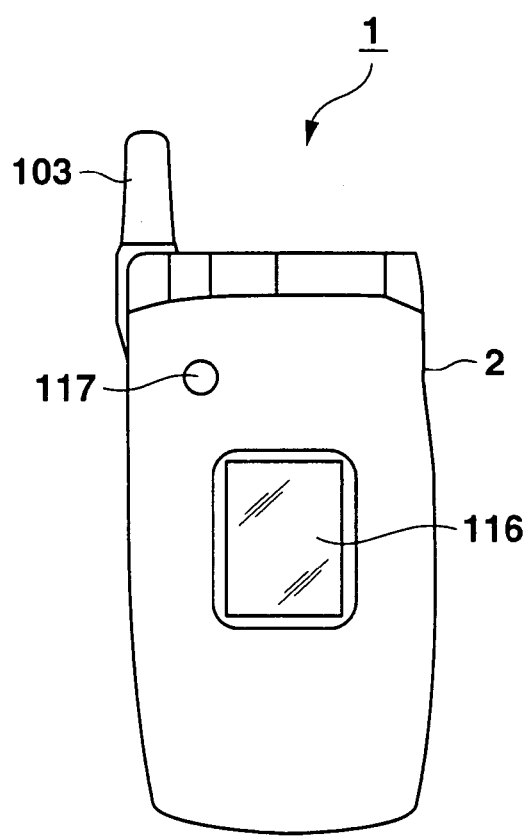
FIG.2A  FIG.2B

| POWER-ON TIME OPERATION | PRIORITY | DETAILED INFORMATION |
|---|---|---|
| MAIL MODE | 1 | PROCESS OF INQUIRING OF MAIL SERVER |
| Web MODE | 2 | ADDRESSED URL →http://abcweb.com/cgi-bin/upload.cgi |
| MAIL MODE | 3 | CREATION OF NEW MAIL (WITH IMAGE ATTACHED) |
| GPS MODE | 4 | PROCESS OF OBTAINING POSITION INFORMATION |
| IMAGE VIEWER | 5 | DISPLAY OF MOST RECENTLY CAPTURED IMAGE |
| ADDRESS BOOK EDIT MODE | 6 | DISPLAY OF ADDRESS INFORMATION IN ADDRESS BOOK No. 01 |
| DIALING | 7 | DESTINATION : 090-1234-5678 |
| ⋮ | ⋮ | ⋮ |

ELECTRONIC DEVICE HAVING IMAGE CAPTURE AND RADIO COMMUNICATION FUNCTIONS, OPERATION CONTROL METHOD AND OPERATION CONTROL PROGRAM

CROSS-REFERENCE TO RELATED APPLICATIONS

This application is based upon and claims the benefit of priority from prior Japanese Patent Applications No. 2003-280646, filed Jul. 28, 2003; and No. 2004-197626, filed Jul. 5, 2004, the entire contents of both of which are incorporated herein by reference.

BACKGROUND OF THE INVENTION

1. Field of the Invention

The present invention relates to an electronic device, such as a mobile phone, which has an image capture device, an operation control method for use with such an electronic device, and an operation control program.

2. Description of the Related Art

In recent years, mobile phones with an image capture device, which have a digital camera built in, have come into wide use. Therefore, the opportunity of capturing an image quite easily with the digital camera built into a mobile phone is increasing. Conventionally, with a mobile phone having a digital camera built in, in order for the user to make an image capture alone (as opposed to talking) in power-off state, he or she first presses the off-hook key long to turn on the power and initialize the radio communication device (power supply to each circuit including terminal verification negotiation with a neighboring base station) and then activates the camera mode (see, for example, Japanese Unexamined Patent Publication No. 2003-69868).

With such a conventional mobile phone, however, when the user suddenly desires to capture an image in power-off state, that is, when a capital opportunity to capture an image is not to be missed, the user is liable to miss the opportunity because the abovementioned procedure is time consuming.

BRIEF SUMMARY OF THE INVENTION

It is an object of the present invention to provide an electronic device with an image capture function and a radio communication function which permits only the image capture to be activated quickly in the power-off state to thereby enable the user to capture an image with ease and the radio communication device to be activated readily in the state where the image capture device is activated, an operation control method, and an operation control program.

According to an embodiment of the present invention, an electronic device comprises radio communication means, image capture means, power supply means, a first power switch, a second power switch, and first power supply control means which, upon detecting an operation of the first power switch, supplies power from the power supply means to the radio communication means and, upon detecting an operation of the second power switch, supplies power from the power supply means to the image capture means.

According to another embodiment of the present invention, an operation control method for use with an electronic device equipped with at least image capture means, radio communication means, and first and second power switches, the method comprises applying power to the radio communication means to cause operate the radio communication means upon detecting an operation of the first power switch; and applying power to the image capture means to cause operate the image capture means upon detecting an operation of the second power switch.

According to still another embodiment of the present invention, an operation control method for use with an electronic device equipped with radio communication means, power supply means, first and second power switches and program storage means, the method comprises storing a plurality of programs into the program storage means in advance, selecting from the plurality of programs a program which is to be executed first when power is applied, and executing the selected program when power is applied to the radio communication means.

According to further embodiment of the present invention, an operation control program for use with an electronic device equipped with image capture means, radio communication means, and first and second power switches, which enables a computer system to perform applying power to the radio communication means to cause operate the radio communication means upon detecting an operation of the first power switch, and applying power to the image capture means to cause operate the image capture means upon detecting an operation of the second power switch.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIGS. 1A and 1B are a front view and a side view in open state, respectively, of a mobile phone with a built-in camera according to a first embodiment of the present invention;

FIGS. 2A and 2B are a rear view and a front view in closed state, respectively, of the mobile phone of the first embodiment;

FIG. 8 shows a setting table shown in FIG. 7; and

DETAILED DESCRIPTION OF THE INVENTION

Figure 3:
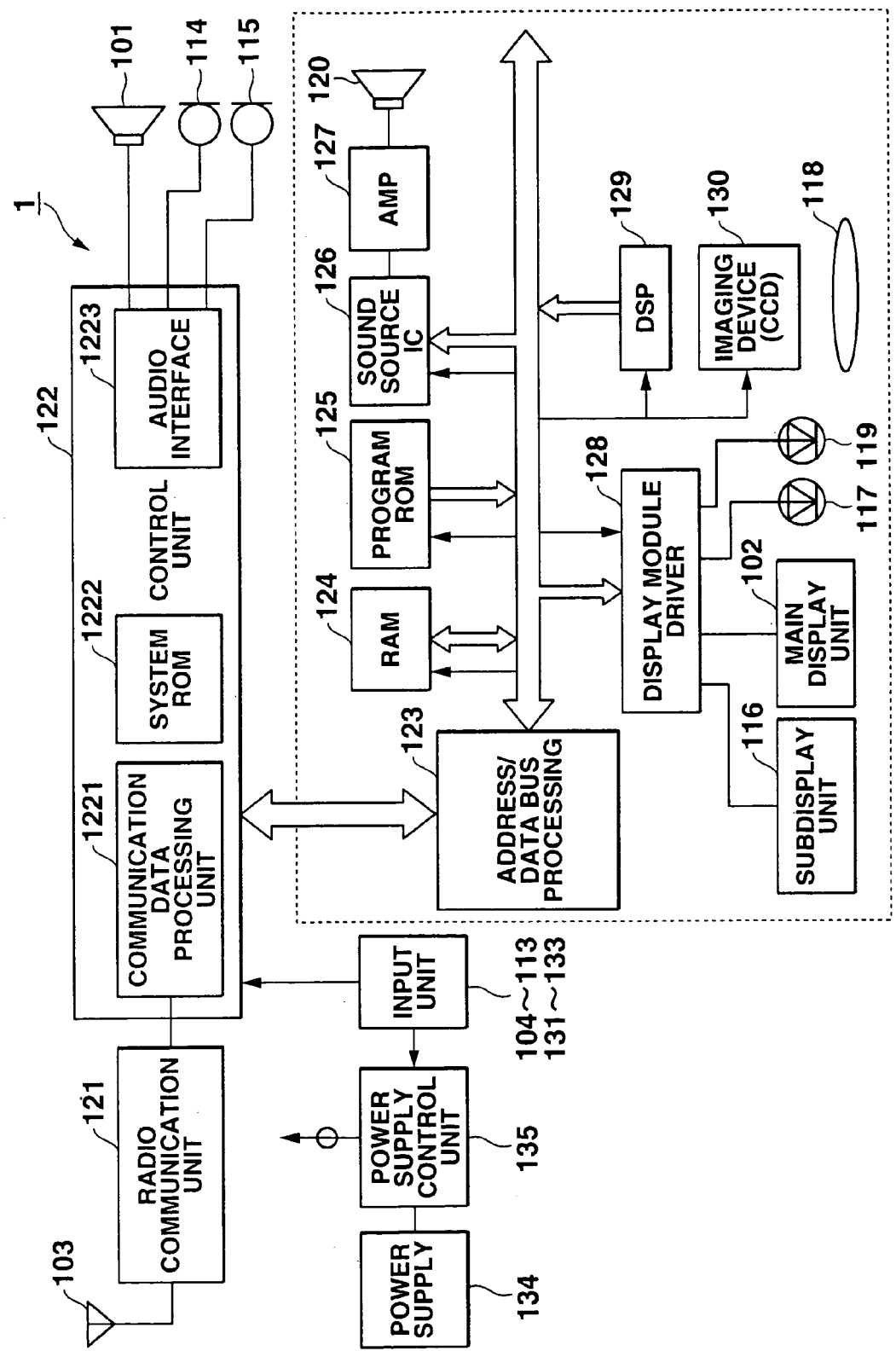
FIG. 3 is a block diagram of the mobile phone of the first embodiment.

An embodiment of an electronic device according to the present invention will now be described with reference to the accompanying drawings. The embodiments of the present invention will be described hereinafter in terms of a mobile phone with a built-in camera.

THE CONFIGURATION OF A FIRST EMBODIMENT

FIGS. 1A and 1B are a front view and a side view in open state, respectively, of a mobile phone 1 with a built-in camera according to the first embodiment. The mobile phone 1 of the first embodiment is a folding structure consisting of a cover unit 2 and a body unit 3. A speaker 101 is provided on the front side of the cover unit 2 and outputs voice at the time of talking in the phone mode. A display unit (main display unit) 102, which is a color liquid crystal panel, has a resolution of 1280×960 dots (Quarter-VGA) and can display a captured image or downloaded image. An extensible antenna 103 is provided at the rear of the body unit.

A camera key 104 is adapted to instruct the transition to the camera mode in the power-on state or the activation of an image capture unit 130 and a DSP 129 which are to be described later. A mail key 105 is adapted to instruct the transition to the mail mode or loading of a mail program. A cross key 106 is adapted to instruct the movement of a cursor or the selection of focus zone. A determination key 197 is adapted to determine the mode selection or other various selections. An address key 108 is adapted to display address book data. A net connect key 109 is adapted to allow connection to the Internet. A clear key 110 is adapted to cancel selections or the like. An on-hook key 111 is adapted for line connection. An off-hook key 112 is a power-off key in both the phone and camera modes, a power-on key for starting up the phone mode, or a key for line disconnection. Ten keys 113 are adapted to input characters or dial. A microphone 114 is provided in the lower portion of the body unit 3 and provides voice input at the time of talking on the phone.

FIGS. 2A and 2B are a rear view and a front view in closed state, respectively, of the mobile phone of the first embodiment. A key 131 is provided on the side of the body unit 3 as shown in FIG. 2A and can be operated even when the mobile phone is closed. This key 131 functions as a power-on key for starting up the camera mode in the power-off state, a key for canceling the camera mode in the state where the mobile phone has been placed in the camera mode, or a manner key in the phone mode. A key 132 is provided on the side of the body unit 3 and can be operated even in the closed state. This key 132 functions as a shutter key when the mobile phone is closed in the camera mode or a memo key in the phone mode. Reference numeral 134 denotes a battery pack.

An objective lens 118 is provided above the battery pack 134 as shown in FIG. 2A and captures a still image or moving image. An LED 119 emits a light at the time of capturing a still image or moving image to prevent shortness of exposure. A microphone 115 is used to record surrounding sound at the time of capturing a moving image in the camera mode. A speaker 120 is adapted to notify the user of an incoming call or the occurrence of emergency or output shutter sound in the camera mode.

As shown in FIG. 2B, at the front of the cover unit 2 is provided a subdisplay unit 116, which, in a state where the mobile phone 1 is closed, is used to display date, notify the user of an incoming call or incoming mail, or display a captured still image or moving image. In the camera mode, the subdisplay unit 116 also serves as an EVF (electric view finder) which displays each image captured sequentially through the objective lens 118 mounted on the body unit 3. An LED 117 is adapted to emit light to notify the user of an incoming call or mail.

FIG. 3 is a block diagram of the mobile phone 1 with a built-in camera. A radio transmit/receive unit 121 modulates voice or data (mail data) and transmits it by radio via an antenna 103 or receives voice or data via the antenna 103 and demodulates it. That is, the unit 121 performs PSK-based modulation and demodulation and CDMA-based communication processing including terminal verification processing.

A control unit 122 exercises control over the mobile phone including WWW connection control. A communication data processing unit 1221 includes a CELP-based audio signal processing circuit, a packet data creation circuit, and a packet data recovery circuit and performs data processing in accordance with communication protocols.

A system ROM 1222 stores a basic system program which mainly controls the whole of radio communication processing in the mobile phone. An audio interface 1223 performs input/output processing on audio signals to the speaker 101 and from the microphones 114 and 115.

An address/data bus processing circuit 123 controls the input/output timing of data to or from the peripheral circuitry (enclosed by dotted lines). A RAM 124 stores data, such as address book data, mail data, etc., which are used in the phone mode, image data captured in the camera mode, and various data created in the device. A program ROM 125, which is comprised of, for example, a rewritable NOR type of flash memory, stores various application programs.

A display module driver 128 drives the subdisplay unit 116, the main display unit 102, and the LEDs 117 and 119. A sound source IC 126 produces a call signal (ringing tone) or the like. An amplifier 127 amplifies an audio signal from the sound source IC 126 and outputs it through the speaker 120. An imaging device 130, which is comprised of a CCD or CMOS device, captures an image focused by the objective lens 118 as a color image. A DSP 129 encodes an image captured by the imaging device 130.

The power supply (battery pack) 134 supplies power required to operate the mobile phone 1. A power supply control circuit 135 supplies power from the power supply 134 to necessary circuits depending on the phone mode or camera mode in response to operating a predetermined key in the input unit. More specifically, when the off-hook key 112 is pressed long so that mobile phone 1 is changed from the power-off state to the power-on state, power is supplied to all the circuits. On the other hand, when the mobile phone 1 is in the closed state and the camera mode startup power on/off key (the manner key in the phone mode) 131 provided on the side is pressed to turn on the power, power is supplied to each circuit unit except the radio communication unit 121.

THE OPERATION OF THE FIRST EMBODIMENT

The operation of the mobile phone of the first embodiment will be described next.

Figure 4:
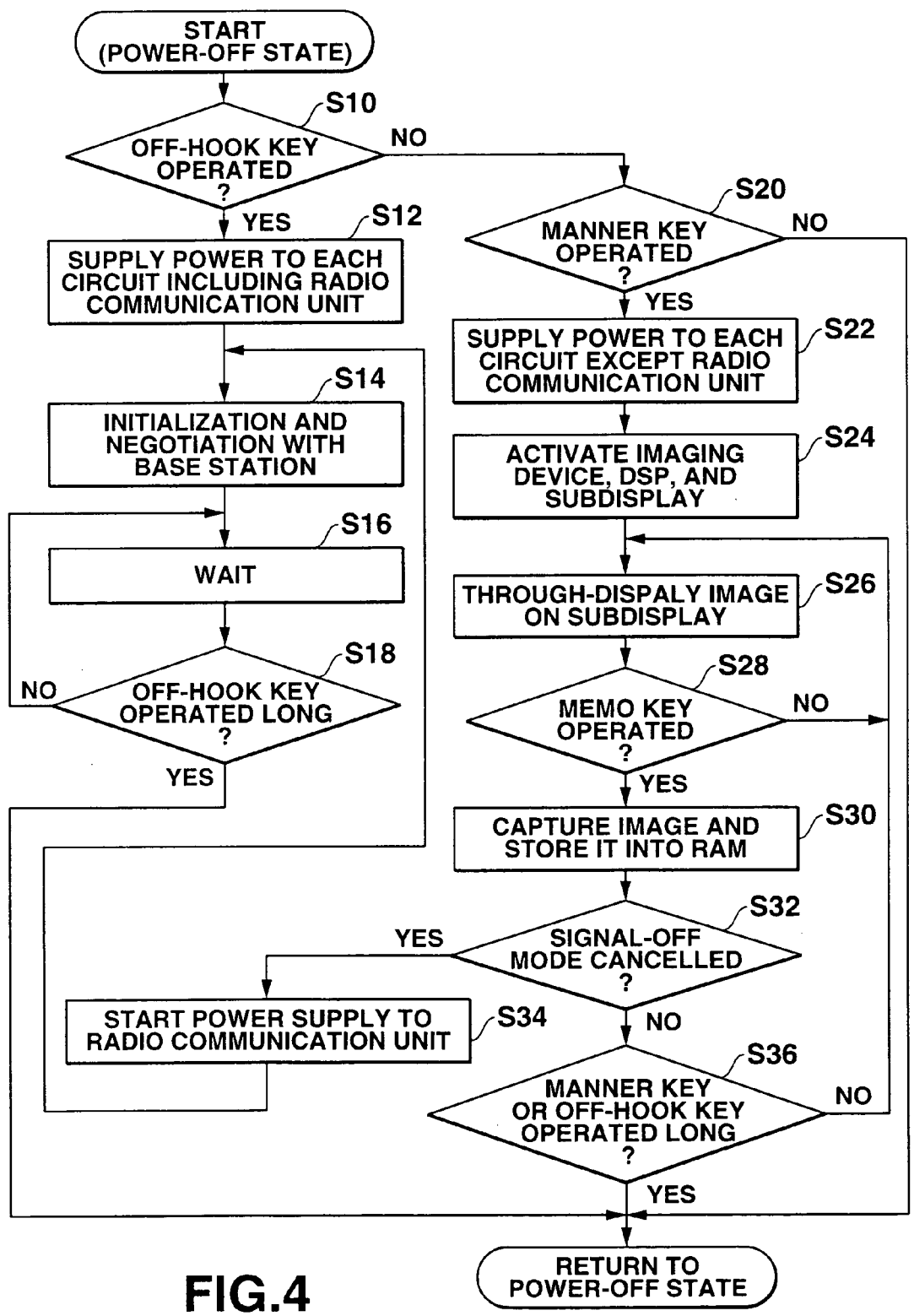
FIG. 4 is a flowchart illustrating the operation of starting up the phone mode, the operation of starting up the camera mode, and the operation in the came mode.

FIG. 4 is a flowchart illustrating the phone mode startup operation, the camera mode startup operation, and the operation in the camera mode in the first embodiment. In the power-off state, a decision is first made as to whether or not the off-hook key 112 has been pressed (step S10). If the off-hook key 112 has been pressed, the power supply control unit 135 supplies power from the power supply 134 to all the circuits including the radio communication unit 121 (step S12).

Next, the control unit 122 performs initialization and negotiation processing with the base station (step S14) and then goes into the wait state (step S16). A decision is next made as to whether or not the off-hook key 112 has been pressed long (step S18). If the off-hook key 112 has not been pressed long, a flow is returned to step S16 to continue the wait state. If, on the other hand, the off-hook key 112 has been pressed long, then the processing is terminated to enter the power-off state.

If the off-hook key 112 is not pressed in the power-off state (NO in step S10), then it is determined whether or not the camera mode startup power on/off key (manner key in the phone mode) 131 provided on the side of the body unit 3 has been pressed (step S20). If the camera mode startup power on/off key 131 is not pressed, then the processing is terminated to continue the power-off state.

If, on the other hand, the camera mode startup power on/off key 131 has been pressed in the power-off state (closed state) (YES in step S20), the power supply control unit 135 supplies power to each circuit unit except the radio communication unit 121 (step S22), so that the mobile phone is placed in the so-called electromagnetic wave (signal) off mode. Next, the imaging device 130, the DSP 129 and the subdisplay unit 116 are activated (step S24). An image (through-image) which is being captured by the imaging device 130 and the DSP 129 is displayed in real time on the subdisplay unit 116 (step S26).

A decision is next made as to whether or not the shutter key (memo key in the phone mode) 132 provided on the side of the body unit has been pressed (step S28). If the shutter key 132 is not pressed, then a flow is returned to step S26 to continue through-image display. If, on the other hand, the shutter key 132 has been pressed, then an image at the time when the shutter is pressed is captured and stored into the RAM 124 (step S30).

Next, it is determined whether or not the off-hook key 112 has been pressed, thereby determining whether or not the signal-off mode has been canceled (step S32). If the signal-off mode has been canceled, that is, if the off-hook key 112 has been pressed (YES in step S32), the supply of power to the radio communication unit 121 is started (step S34) and the flow goes to step S14 to start up the phone mode. If, on the other hand, the signal-off mode has not been canceled (NO in step S32), then it is determined whether or not the camera mode startup power on/off key 131 or the off-hook key 112 has been pressed long (step S36). If the camera mode startup power on/off key 131 or the off-hook key 112 is not pressed long, then a flow is returned to step S26 to display a through-image which is being captured by the imaging device 130 and the DSP 129 in real time on the subdisplay unit 116, thus continuing the image capture operation. If either of the camera mode startup power on/off key 131 and the off-hook key 112 has been pressed long, then the processing is terminated to continue the power-off state.

According to the mobile phone of the first embodiment, as described above, in order for the user to capture an image immediately when the phone is in the power-off state, he or she simply operates the camera mode setting power on/off key (manner key in the phone mode) provided on the side of the body unit 3. By so doing, power can be applied to each circuit unit except the radio communication unit 121. Therefore, only the camera mode can be set without performing initialization of the radio communication function (power supply to each circuit and terminal verification negotiation with the neighboring base station). This allows the user to easily capture an image at any time without missing a capital picture-taking opportunity. In addition, operating the off-hook key 112 in a state where only the camera mode has been set causes power to be applied to the radio communication unit 121 as well, allowing the radio communication function to be performed. Therefore, the transition from the camera mode to the phone mode can be made smoothly and quickly. This will allow the user to transmit mail with a captured image readily and increase the handiness of the mobile phone with a built-in camera.

SECOND EMBODIMENT

A second embodiment of the present invention will be described next.

Figure 5:
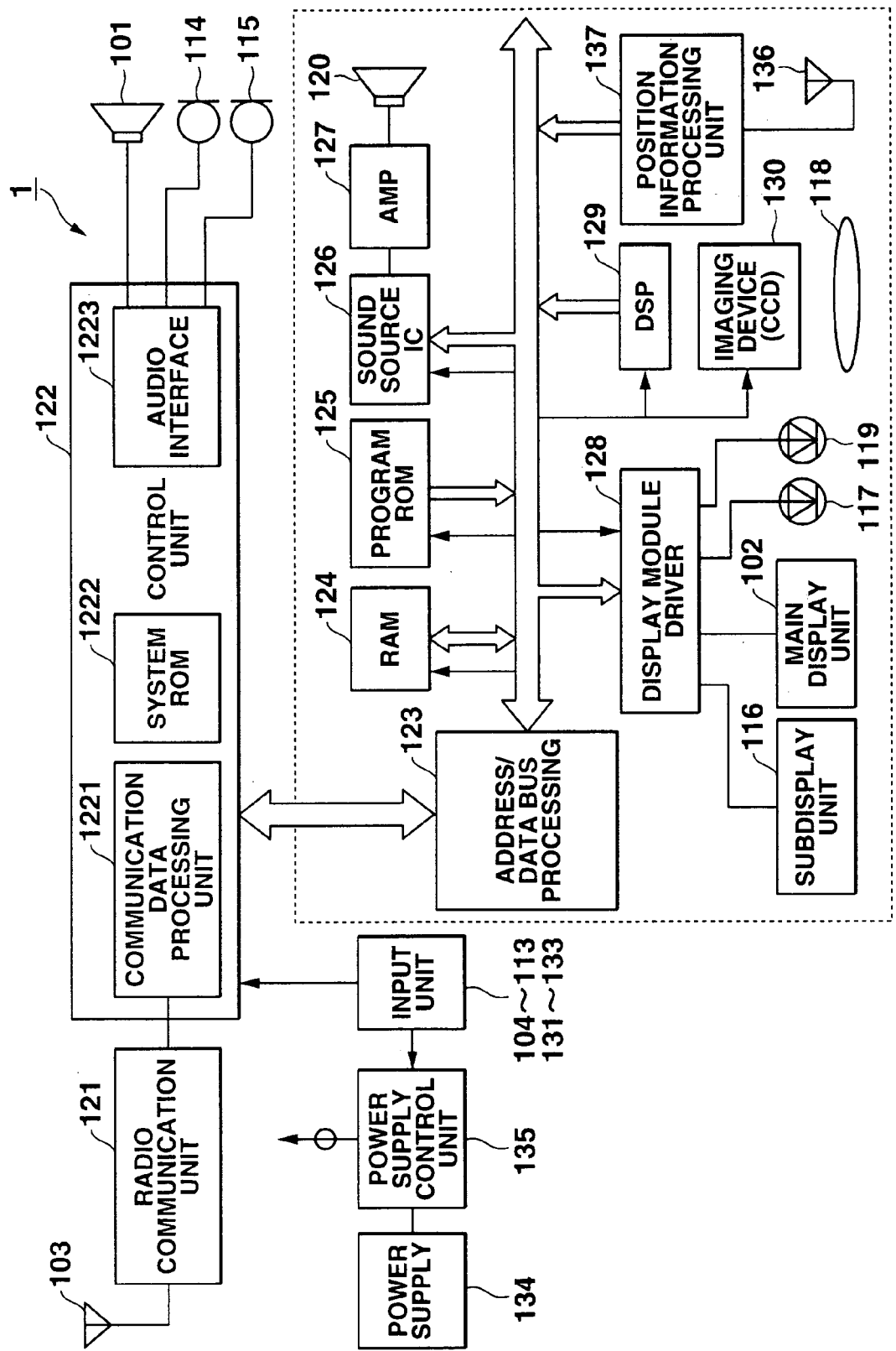
FIG. 5 is a block diagram of a mobile phone according to a second embodiment of the present invention.

FIG. 5 is a block diagram of a mobile phone according to the second embodiment. In this drawing, corresponding parts to those in FIG. 3 are denoted by the same reference numerals and descriptions thereof are omitted. The second embodiment shown in FIG. 5 is distinct from the first embodiment shown in FIG. 3 in that a GPS antenna 136 and a position information processing unit 137 are added. The GPS antenna 136 receives signals (1.22760 G/1.57542 GHz) transmitted from at least four of the geodetic satellites (NAVSTAR) launched by the Department of Defense (at present, 24 satellites are orbiting the earth). The position information processing unit 137 determines the difference in arrival time of the signals and calculates the current position of the receiver (mobile phone). The position information thus obtained comprises latitude, longitude and (altitude, if necessary) information. In calculating the receiver's position, signals from three or less satellites may be used but the position accuracy will be reduced.

Figure 6:
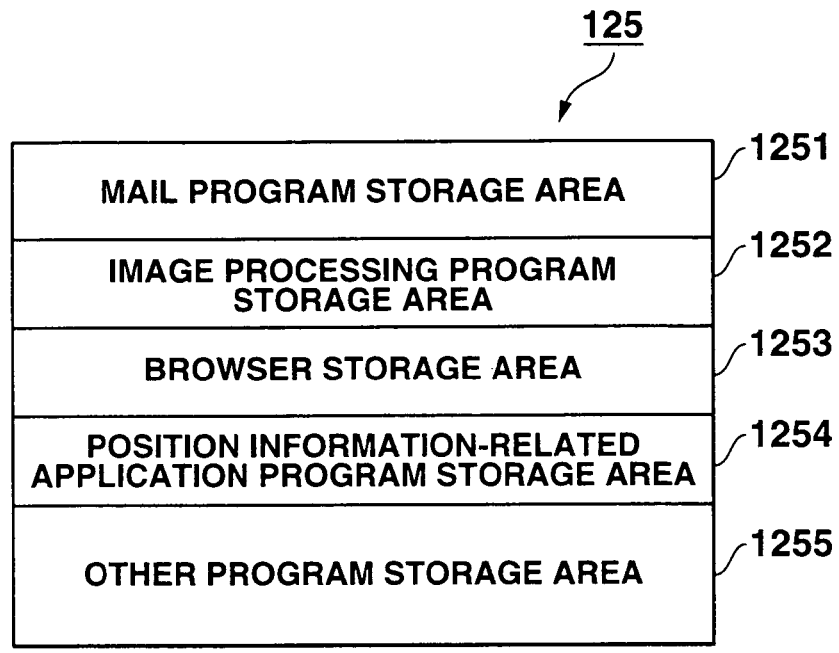
FIG. 6 shows memory areas in the ROM in the mobile phone shown in FIG. 5.

FIG. 6 shows memory areas in the ROM 125 in the mobile phone 1 of the second embodiment. The ROM 125 comprises a mail program storage area 1251, an image processing program storage area 1252, a browser storage area 1253, a position information-related application program storage area 1254, and a storage area 1255 for other programs.

The mail program storage area 1251 stores a mail software program which allows communications with an external mail server. The image processing program storage area 1252 stores an image processing program which performs various image processes on image data captured and encoded by the image capture unit (the objective lens 118, the imaging device 130, and the DSP 129) and buffered in the RAM 124. The image processing program may be downloaded from a server over the Internet. The browser storage area 1253 stores a browser program for viewing files transferred over the Internet. The position information-related application program storage area 1254 stores an application program for allowing the position information processing unit 137 to calculate the receiver's position. The other program storage area 1255 stores other application programs.

Figure 7:
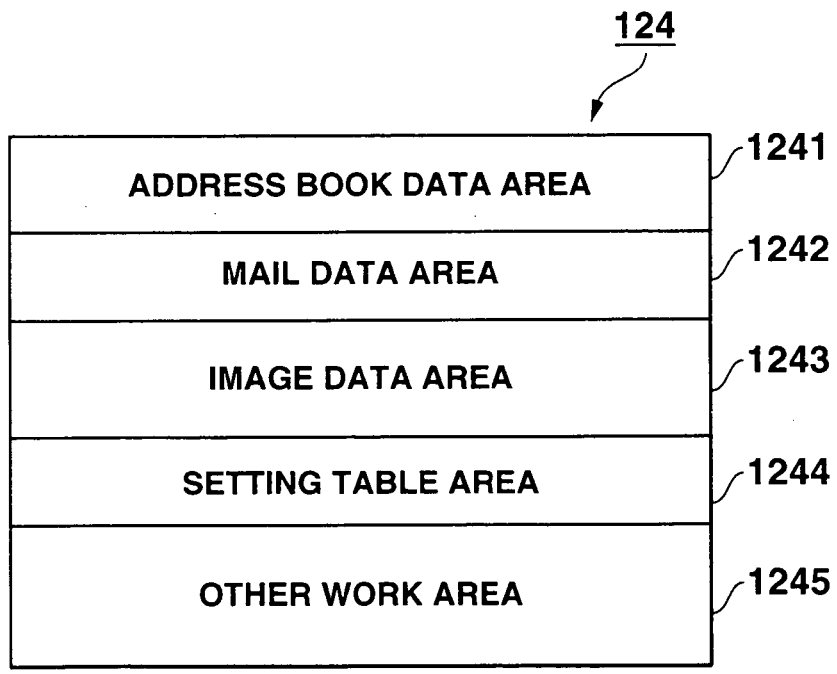
FIG. 7 shows memory areas in the RAM in the mobile phone shown in FIG. 5.

FIG. 7 shows memory areas in the RAM 124 in the mobile phone 1 of the second embodiment. The RAM 124 comprises an address book data area 1241, a mail data area 1242, an image data area 1243, a setting table area 1244, and another work area 1245. The address book data area 1241 stores a list of records each of which has a set of a name, telephone number, mail address, and so on. The mail data area 1242 stores mail data created using mail software and received mail data. The image data area 1243 stores a file when a mail is accompanied by that file. The setting table area 1244 stores a table in which operations to be performed at power-on time and their priority are set. The other work area 1245 stores various data as another work memory.

FIG. 8 shows the setting table stored in the area 1244. In this table, programs which are to be executed after the power has been applied to the radio communication unit 121 in response to operation of the off-hook key 112 are set up according to their priority. The priority can be established arbitrarily by the user. The programs are loaded from the program ROM 125. The programs to be executed includes ones which involve communication processing at execution. The communication processing is controlled so that it is skipped according to the priority and the results of negotiation (the mobile phone is out of service area or the receiving sensitivity is poor).

The main server inquiry processing supposes that there are users who, upon turning on the power, first checks mail. In the Web (net connection) mode, access is made to a predetermined URL. In the new transmit mail creation, when the power is turned on, mail is sent with a captured image attached. The GPS mode supposes that the position information (shooting place) is embedded in captured image data. The image viewer is a kind of program contained in the image processing program. The address book edit mode supposes that a captured image is linked to the address book. The dialing is not related to image capture processing but supposes that, in case of emergency, a preset telephone number is automatically dialed upon turning on the power.

THE OPERATION OF THE SECOND EMBODIMENT

Figure 9:
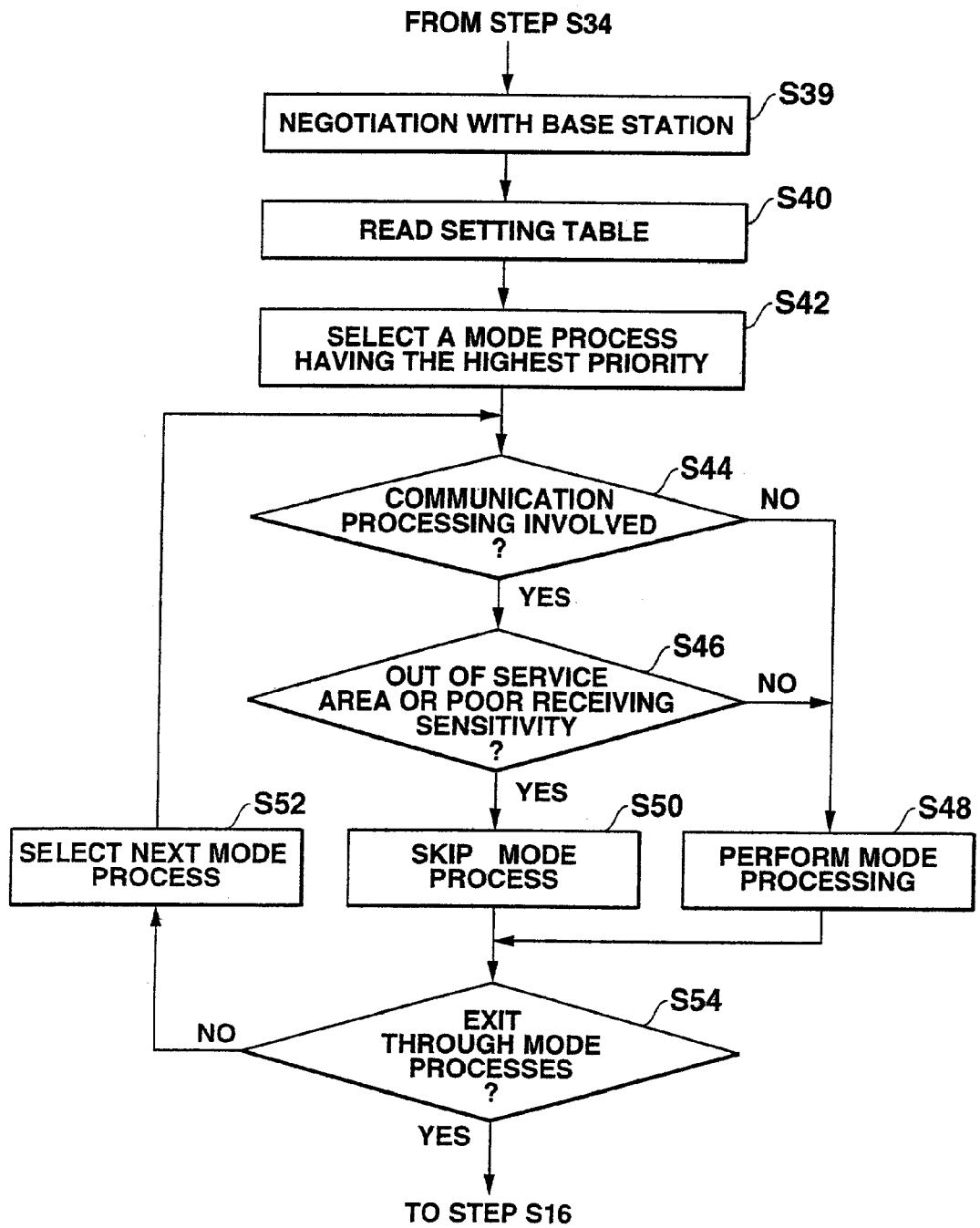
FIG. 9 is a flowchart illustrating a part of the operation of the mobile phone of the second embodiment.

The operation of the second embodiment will be described hereinafter. FIG. 9 is a flowchart illustrating part of the operation of the mobile phone 1 of the second embodiment. The flowchart of FIG. 9 illustrates the operation to be performed following step S34 in the flowchart of FIG. 4 illustrating the operation of the first embodiment. The description of the operation through step S34 shown in FIG. 4 is applied to the second embodiment.

When the cancellation of the signal-off mode is detected (the off-hook key 112 is operated) (YES in step S32), power supply to the radio communication unit 121 is started (step S34), then the negotiation processing with the radio base station is performed (step S39), the setting table is read (step S40), and the a mode process having the highest priority is selected (step S42).

Next, it is determined whether or not communication processing is involved in the selected mode process (step S44). If communication processing is involved, then it is determined whether or not the receiver is out of service area or the receiving sensitivity is poor (step S46). If it is determined that the receiver is out of service area or the receiving sensitivity is poor, then the mode process is skipped (step S50).

Next, it is determined whether or not the occurrence of exist through the mode process by the operation of the off-hook key has been detected (step S54). If not detected, a flow is returned to step S44 through a step S52 in which a next mode is selected from the setting table area 1244. If, on the other hand, the occurrence of exit from the mode processes has been detected, the flow goes to step S16 shown in FIG. 4 in such a way as to automatically leave the camera mode (power supply to the DSP 29 and the imaging device 130 is stopped).

If no communication processing is involved in the selected mode process (NO in step S44), or if, even when communication processing is involved, the receiver is present within the service area or the receiving sensitivity is good (NO in step S46), then the mode process is performed (step S48).

According to the mobile phone of the second embodiment, a mode process which needs a communication function is skipped according to the results of negotiation (the mobile phone is out of service area or the receiving sensitivity is poor).

What is claimed is:

1. An electronic device comprising:
a radio communication unit;
an image capture unit;
a power supply;
a first power switch;
a second power switch; and
a power supply control unit which, upon detecting an operation of the first power switch while the electronic device is in a power-off state, supplies power from the power supply to the radio communication unit and the image capture unit, and which, upon detecting an operation of the second power switch while the electronic device is in the power-off state, supplies power from the power supply to the image capture unit and does not supply power from the power supply to the radio communication unit.

2. The electronic device according to claim 1, wherein upon detecting an operation of the first power switch after the operation of the second power switch has been detected, the power supply control unit supplies the power from the power supply to the radio communication unit.

3. The electronic device according to claim 2, further comprising:
a program storage unit which stores a plurality of programs;
a selecting unit which selects from the plurality of programs stored in the program storage unit a program to be executed first when the power is supplied to the radio communication unit in accordance with the operation of the first power switch; and
a control unit which executes the program selected by the selecting unit when the power is supplied to the radio communication unit.

4. The electronic device according to claim 3, further comprising:
a priority storage unit which stores an execution priority of the plurality of programs; and
a determination unit which determines a communication condition of the radio communication unit;
wherein the selecting unit selects one of the programs to be executed in accordance with the execution priority stored in the priority storage unit and a determination of the communication condition by the determination unit.

5. The electronic device according to claim 3, wherein the plurality of programs include an electronic mail processing program for performing communication processing with an external mail server through radio communication processing by the radio communication unit.

6. The electronic device according to claim 3, wherein the plurality of programs include a browser program for browsing files which are transferred from an external network through the radio communication unit.

7. The electronic device according to claim 3, wherein the plurality of programs include a voice processing program for performing voice communication processing through the radio communication unit.

8. The electronic device according to claim 3, further comprising a position information acquisition unit which acquires position information;
   wherein the plurality of programs include a program for performing operations on the position information acquired by the position information acquisition unit to calculate a position of the electronic device.

9. The electronic device according to claim 1, further comprising a cover unit and a body unit, which are foldable with respect to each other;
   wherein the first power switch is positioned at a portion of the electronic device which is exposed when the electronic device is in an unfolded state; and
   wherein the second power switch is placed at a portion of the electronic device which is exposed when the electronic device is a folded state.

10. An operation control method for an electronic device which comprises a radio communication unit, an image capture unit, a power supply, a first power switch, and a second power switch, said operation control method comprising:
   applying power to the radio communication unit and the image capture unit and causing the radio communication unit and the image capture unit to operate, upon detecting an operation of the first power switch while the electronic device is in a power-off state; and
   applying power to the image capture unit and not applying power to the radio communication unit, and causing the image capture unit to operate and the radio communication unit not to operate, upon detecting an operation of the second power switch while the electronic device is in the power-off state.

11. The operation control method according to claim 10, further comprising applying the power to the radio communication unit and causing both the image capture unit and the radio communication unit to operate, upon detecting an operation of the first power switch after the second power switch has been operated.

12. The operation control method according to claim 10, further comprising:
   storing a plurality of programs into a program storing unit in advance;
   selecting from the plurality of programs a program which is to be executed first when the power is applied to the radio communication unit; and
   executing the selected program when the power is applied to the radio communication unit.

13. The operation control method according to claim 12, wherein each of the plurality programs is assigned an execution priority, and wherein the operation control method further comprises:
   determining a communication condition of the radio communication unit; and
   selecting one of the programs to be executed in accordance with the execution priority and the determined communication condition.

14. The operation control method according to claim 12, wherein the plurality of programs include an electronic mail processing program for performing communication processing with an external mail server through radio communication processing by the radio communication unit.

15. The operation control method according to claim 12, wherein the plurality of programs include a browser program for browsing files which are transferred from an external network through the radio communication unit.

16. The operation control method according to claim 12, wherein the plurality of programs includes a voice processing program for performing voice communication processing through the radio communication unit.

17. The operation control method according to claim 12, wherein the plurality of programs include a program for calculating a position of the electronic device.

18. The control method according to claim 12, further comprising applying the power from the power supply to at least the radio communication unit upon detecting an operation of the first power switch after the second power switch has been operated.

19. A computer readable recording medium having a computer readable program stored thereon that is executable by a computer system of an electronic device, wherein the electronic device comprises a radio communication unit, an image capture unit, a power supply, a first power switch, and a second power switch, wherein the computer readable program is executable by the computer system to cause the computer system to perform functions comprising:
   applying power to the radio communication unit and the image capture unit and causing the radio communication unit and the image capture unit to operate, upon detecting an operation of the first power switch while the electronic device is in a power-off state; and
   applying power to the image capture unit and not applying power to the radio communication unit, and causing the image capture unit to operate and the radio communication unit not to operate, upon detecting an operation of the second power switch while the electronic device is in the power-off state.

* * * * *